Sept. 27, 1932.  J. R. DOWNES ET AL  1,879,135
SEDIMENTATION TANK
Filed March 22, 1929  3 Sheets-Sheet 2
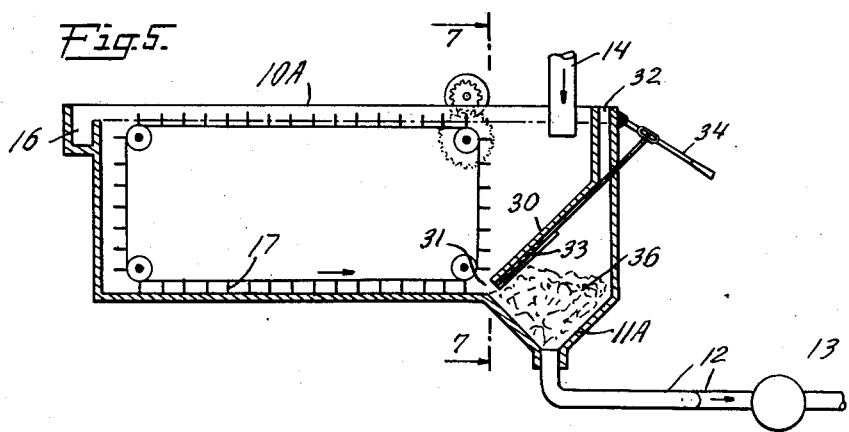
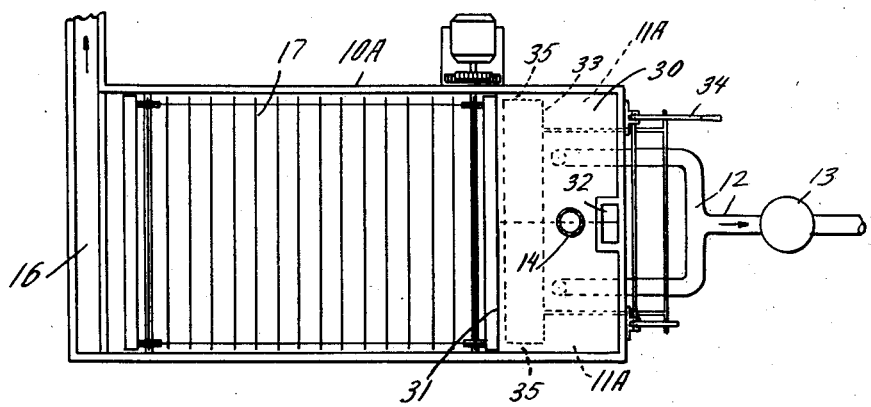
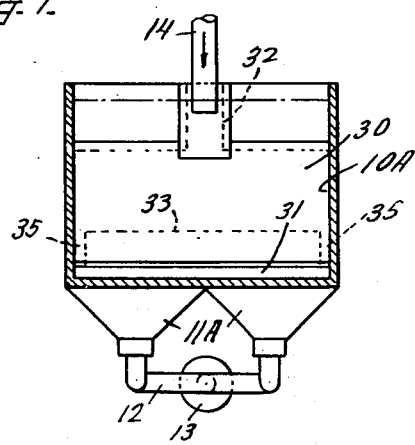
INVENTORS
John R. Downes
Samuel Fisher Miller
BY
Marshall & Hawley
ATTORNEYS

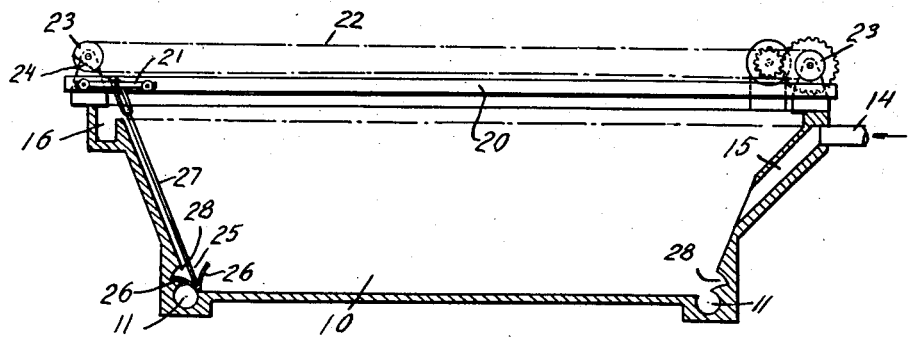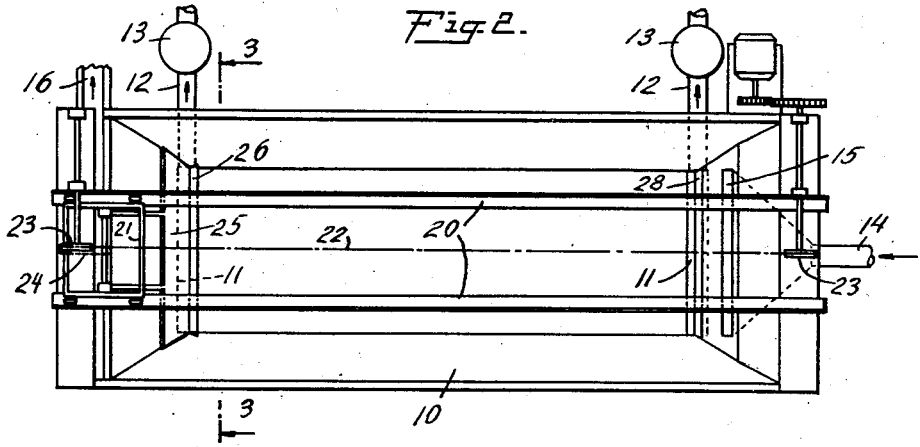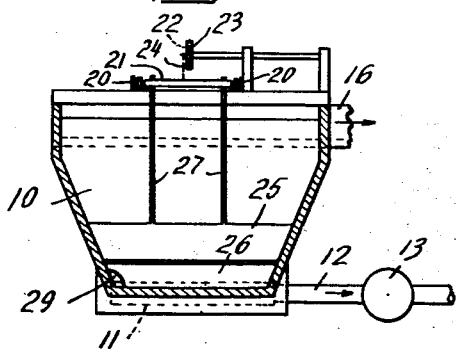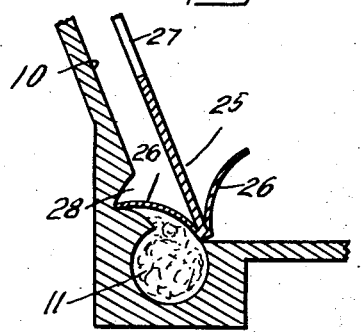

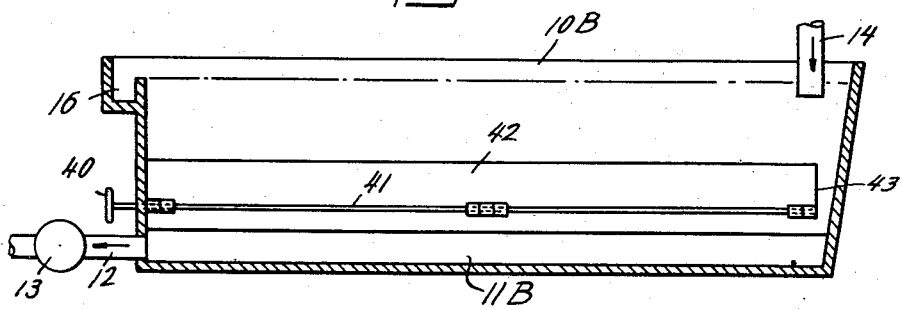
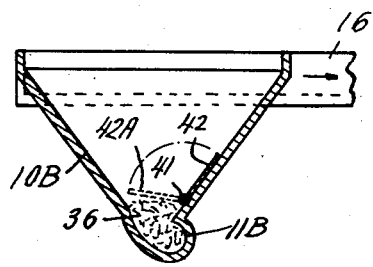
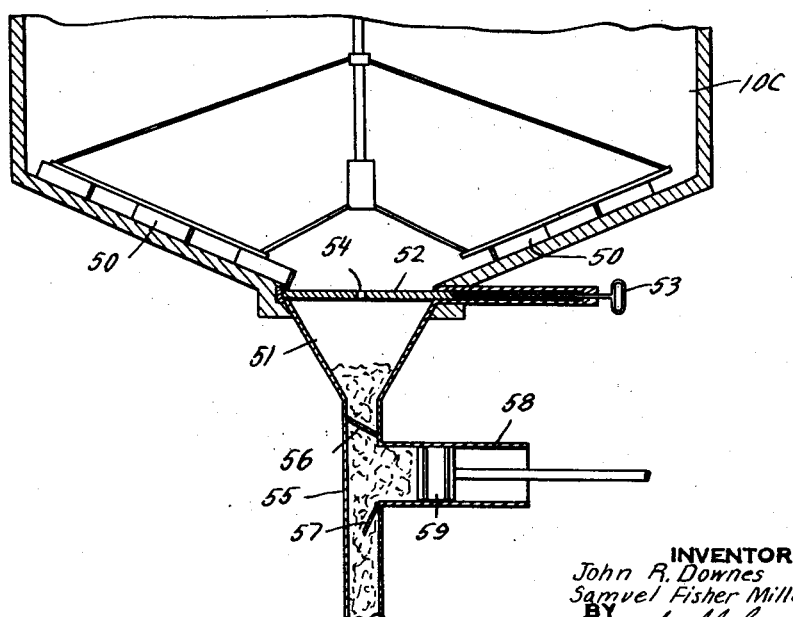

Patented Sept. 27, 1932

1,879,135

UNITED STATES PATENT OFFICE

JOHN R. DOWNES, OF MIDDLESEX, AND SAMUEL F. MILLER, OF BAY HEAD, NEW JERSEY, ASSIGNORS TO PACIFIC FLUSH-TANK COMPANY, OF NEW YORK, N. Y., A CORPORATION OF ILLINOIS

SEDIMENTATION TANK

Application filed March 22, 1929. Serial No. 349,019.

This invention relates to improvements in sedimentation tanks and its object is to improve apparatus of this character and to provide an apparatus from which settled sludge may be withdrawn more effectively than has been possible with such arrangements as have been available heretofore.

In sewage disposal plants, clarification is obtained in sedimentation tanks in which the sludge separates from the supernatent liquid, and from which the sludge and the clarified liquid are withdrawn independently. Mechanical devices are employed for scraping the sludge from the surfaces on which it is deposited and for moving it to a sump from which it is withdrawn, usually by means of a suction pump. It is the purpose of all such devices to provide for the removal of the sludge with the least possible amount of the clarified liquid going out with it. But it has been impossible to prevent an undesired amount of the clarified liquid to be discharged with the sludge, which is termed "short-circuiting". This interferes with the after-treatment or digestion of the sludge, often to such an extent that the matter withdrawn has to be put back into the sedimentation tanks and therein treated over again. By the use of our invention, the sludge is more completely removed from the tank, and a more thorough separation of the sludge from the supernatent liquid is effected, thereby improving the efficiency of the treatment. Moreover our invention enables the separation to be effected more rapidly with simple and inexpensive installations which cover less space than former apparatus.

More specifically, the object of our invention is to form a barrier at the time the sludge outlet is opened, between the sump in which the sludge is collected and the rest of the tank. The other objects of this invention will appear in the following specification in which we will describe certain apparatus which embody our invention, the specific features of which will be set forth in claims.

In the drawings Fig. 1 is a sectional elevation of a sedimentation tank which is made according to and embodies our invention;

Fig. 2 is a plan view and Fig. 3 a sectional transverse elevation of the same apparatus. The section in Fig. 3 is taken on the line 3—3 of Fig. 2;

Fig. 4 is an enlarged sectional side elevation of some of the parts shown in Figs. 1, 2 and 3;

Fig. 5 is a sectional elevation of a sedimentation tank with a well known form of mechanical scraper, the construction being modified to embody our invention;

Fig. 6 is a plan and Fig. 7 a sectional transverse view of the apparatus shown in Fig. 5. The section in Fig. 7 is taken on line 7—7 of Fig. 5;

Figs. 8 and 9 are sectional side and end elevations respectively which illustrate another form of apparatus which is made according to our invention; and Fig. 10 is a sectional elevation of a still further modified structure which also embodies the invention.

Referring now to Figs. 1, 2, 3 and 4, 10 designates a rectangular tank with inwardly sloping walls and a flat bottom. 11 are sumps transversely disposed at the ends and slightly below this flat bottom. Each of them is connected by pipes 12 with independent suction pumps 13. 14 is a sewage inlet pipe connected with an inlet channel 15 at one end of the tank and 16 is an outlet trough at the other end of the tank from which the clarified liquid is withdrawn by gravity.

Longitudinally disposed across the top of the tank are a pair of parallel channels 20 on which runs a wheeled frame 21. Intermediate the channels is a motor driven endless chain 22 running around sheaves 23 to which chain is connected another chain 24 the other end of which is connected with the traveling frame 21. 25 is a scraper with out-turned blades 26. Arms 27 extend from this scraper to the frame 21 with which they have slotted connections.

The chain 22 runs continuously in one direction. The chain 24 causes the frame 21 to move back and forth across the top of the tank with periods of rest during the times the point of connection between the link and the chain is passing around from the top to the bottom of one of the sheaves 23 and from the bottom to the top of the other sheave.

The scraper rests at all times on the bottom of the tank. Assume that it is drawn from right to left by the frame 21 until it reaches the position in which it is shown in the drawings. It will scrape the sludge into the left hand sump 11 and will form a closure between the tank and the sump. The end wall of the tank is cut away to form a recess 28 into which one of the blades 26 enters and in which it remains during the time the frame 21 is at rest and until the latter has moved to the right far enough to move the arms 27 to a vertical position. During this time of closure, the pump 13 which is connected with this left hand sump is operated.

A part of the scraper 25 opposite the end of the sump with which the discharge pipe 12 is connected, is cut away as shown at 29 in Fig. 3 which prevents the creation of an undesired vacuum in the sump. This opening or vent will permit a certain amount of liquid from the tank to enter the sump back of the sludge, but the pump action will be stopped before this liquid reaches the discharge pipe 12.

Thus the sludge is entrapped in a channel of uniform cross-section in which its discharge movement is at a constant rate, followed up by the clarified liquid at a sufficient rate to cleanse the channel without disrupting the body of sludge. The rate of movement is so proportioned that the sludge moves en masse or piston fashion, the liquid following and replacing the sludge but not penetrating it.

It will be seen that by this arrangement nothing but sludge will be drawn off through the pump, that the objectionable short-circuiting is effectively avoided, and that the sludge is more completely removed from the tank.

Referring now to Figs. 5, 6 and 7, 10A designates a substantially rectangular sedimentation tank with sumps 11A at one end thereof. The two-part sump is connected by pipes 12 with a suction pump 13. 14 is the supply pipe for sewage, disposed at one end of the tank, and the outlet trough 16 is at the other end of the tank. An endless chain of scrapers 17 is driven by suitable gearing to scrape such sludge as settles on the bottom of the tank, into the sump. The parts so far described are of known construction.

We provide across the sludge discharge end of the tank a baffle plate 30 which is set at a sufficiently steep angle so as to prevent the sludge from sticking to it. This baffle plate extends downwardly to a line near the bottom of the tank where the latter joins the side walls of the sump, leaving a narrow slot 31 through which the sludge must pass to enter the sump. A vent 32 is provided between the baffle plate and the adjacent end of the tank. If desired, a sliding gate 33 may be provided, actuated by a lever 34, to close the slot 31. This is preferably somewhat shorter than the width of the slot, as may be seen at 35, 35 in Figs. 6 and 7 to provide for the vent for the sump.

The inlet 14 is placed over the baffle plate 30 so that the incoming sewage creates a current across the slot 31 in a direction opposed to the movement of the scrapers 17 along the bottom of the tank 10A. The incoming sewage will therefore have a tendency to flow past the slot into the tank rather than into the sump. But the scrapers push the sludge into the sump where it accumulates as indicated at 36. When a sufficient amount of it has been accumulated the pump 13 may be started to withdraw it. The pump is stopped before the sump is emptied entirely and before any clarified liquid reaches the outlet pipes. In the meantime the current created by the incoming sewage counteracts the current caused by the pump and by the movement of the scrapers.

As a further precaution, the gate 33 may be closed before the pump is started. The spaces 35 are left to prevent any undue vacuum being formed in the sump chamber.

A simple embodiment of our invention is shown in Figs. 8 and 9 in which is a tank 10B of V-shaped cross-section with a sump 11B under it. The side walls of such a tank are sufficiently steep to prevent the adhesion of an undesirable amount of sludge. This apparatus has a sewage inlet pipe 14 and an outlet trough 16 for the clarified liquid, and one end of the sump is connected with a suction pump 13 by a pipe 12.

40 is a hand-wheel on a rod 41 which carries a shutter 42. After a certain amount of sludge has accumulated in the sump and the bottom of the tank, as shown at 36, the shutter is moved over onto it into some such position as that indicated at 42A and then the pump 13 is started. The shutter will fall down as the sludge is evacuated, the wall of the sump opposite the rod 41 being formed to provide for such a movement. The end 43 of the shutter does not quite reach the end of the sump opposite its discharge end, so that some liquid may run into the sump back of the sludge, but the pump will be stopped before this liquid reaches the discharge pipe 12.

Fig. 10 illustrates a sedimentation tank 10C of known form with our invention applied thereto. This is provided with rotary scrapers 50 which push the sludge into a sump 51. We have provided a slidable shutter 52 with a handle 53 which may be moved into the position shown between the bottom of the tank and the top of the sump. This shutter is provided with an orifice 54 to prevent the formation of an undesired vacuum in the sump.

55 is the sludge discharge pipe in which are check-valves 56 and 57. 58 is a pump cylinder between the check valves and 59 is a piston therein. The shutter 52 is closed before the piston 59 is moved to evacuate the sump.

We have illustrated and described several arrangements of widely different construction in order to show that our invention is not limited to any specific structure, and we intend no limitations other than those which are imposed by the appended claims.

What we claim is:

1. A sedimentation tank, a sewage inlet and an outlet for clarified liquid, a sump at the end of the tank, a scraper having an intermittent reciprocatory movement arranged to move sludge to the sump and having a part arranged to be moved periodically between the tank and the sump, and means connected with one end of the sump for evacuating the sump during the periods when said scraper part is between the tank and the sump, said scraper part being cut away at the other end of the sump to form a restricted passage between the tank and the sump.

2. A sedimentation tank, a sewage inlet and an outlet for clarified liquid, a sump at the end of the tank, the end wall of the tank being constructed to form a recess above the sump, a scraper having an intermittent reciprocatory movement arranged to move sludge to the sump and having an outwardly projecting blade arranged to enter said recess to periodically restrict the communication between the tank and the sump, and means for evacuating the sump during the periods of restricted communication.

3. A sedimentation tank, a sewage inlet and an outlet for clarified liquid, a sump at the end of the tank, the end wall of the tank being constructed to form a recess above the sump, a scraper having an intermittent reciprocatory movement arranged to move sludge to the sump and having an outwardly projecting blade arranged to enter said recess to periodically restrict the communication between the tank and the sump, and evacuating means connected with the sump arranged to be operated during the periods of restricted communication, said blade being cut away at a point remote from said evacuating means connection to provide a restricted passage between the tank and the sump.

4. A sedimentation tank, a sewage inlet and an outlet for clarified liquid, a sump at the end of the tank, the end wall of the tank being constructed to form a recess above the sump, a scraper having an intermittent longitudinal reciprocatory movement arranged to move sludge to the sump and having an outwardly projecting blade arranged to enter said recess to periodically restrict the communication between the tank and the sump and having a swinging movement between its longitudinal movements to prolong the time said blade is in the recess, and evacuating means arranged to be operated during the periods of restricted communication.

5. A sedimentation tank, a sewage inlet and an outlet for clarified liquid, a sump at the end of the tank, the end wall of the tank being constructed to form a recess above the sump, a scraper having an intermittent longitudinal reciprocatory movement arranged to move sludge to the sump and having an outwardly projecting blade arranged to enter said recess to periodically restrict the communication between the tank and the sump and having a swinging movement between its longitudinal movements to prolong the time said blade is in the recess, and evacuating means connected with one end of the sump arranged to be operated during the periods of restricted communication, said blade being cut away at a point near the other end of the sump to provide a restricted passage between the tank and the sump.

6. A sedimentation tank, a sewage inlet and an outlet for clarified liquid, a sump at each end of the tank, a scraper having an intermittent reciprocatory movement arranged to move sludge to the sumps and alternately and periodically to restrict the communication between the tank and the oppositely disposed sumps, and means for evacuating said pumps during the periods of restricted communication.

7. A sedimentation tank, a sewage inlet and an outlet for clarified liquid, a sump at each end of the tank, the end walls of the tank each being constructed to form a recess above its respective sump, a scraper having an intermittent reciprocatory movement arranged to move sludge to the sump and having outwardly projecting blades arranged to enter said recesses alternately and periodically to restrict the communication between the tank and the oppositely disposed sumps, and means for evacuating said sumps during the periods of restricted communication.

8. A sedimentation tank, a sewage inlet and an outlet for clarified liquid, a sump at each end of the tank, the end walls of the tank each being constructed to form a recess above its respective sump, a scraper having an intermittent longitudinal reciprocatory movement arranged to move sludge to the sumps and having outwardly projecting blades arranged to enter said recesses alternately and periodically to restrict the communication between the tank and the oppositely disposed sumps, and having a swinging movement between its longitudinal movement to prolong the time said blades are in the recesses, and means for evacuating said sumps during the periods of restricted communication.

9. A sedimentation tank, a sewage inlet and an outlet for clarified liquid, a sump of uniform cross-sectional area in communication with the tank, evacuating means connected with the sump and arranged to be operated occasionally, and a movable member arranged to be interposed between the tank and the sump when the evacuating means is operated, said member being constructed to provide a restricted passage between the tank and the sump at a point remote from said evacuating means connection.

10. A sedimentation tank, a sewage inlet and an outlet for clarified liquid, a sump of uniform cross-sectional area at each end of the tank, the end walls of the tank each being constructed to form a recess above its respective sump, a scraper having an intermittent longitudinal reciprocatory movement arranged to move sludge to the sumps and having outwardly projecting blades arranged to enter said recesses alternately and periodically to be interposed between the tank and the oppositely disposed sumps, and having a swinging movement between its longitudinal movement to prolong the time said blades are in the recesses, said scraper being constructed to form a restricted passage between the tank and the sumps at one end of the sumps, and means for evacuating said sumps during the periods of restricted communication, said evacuating means being connected with the sumps at the ends thereof opposite said restricted passages.

In witness whereof, I have hereunto set my hand this first day of March, 1929.
JOHN R. DOWNES.

In witness whereof, I have hereunto set my hand this 14th day of March, 1929.
SAMUEL F. MILLER.